Patented Nov. 21, 1950

2,531,010

UNITED STATES PATENT OFFICE 2,531,010

9-[2 - (2 - HYDROXYETHYLAMINO) ETHYL-AMINO] ACRIDINE AND METHOD FOR ITS PRODUCTION

Alexander R. Surrey, Albany, N. Y., assignor to Sterling Drug Inc., Wilmington, Del., a corporation of Delaware No Drawing. Application January 22, 1949, Serial No. 72,266

3 Claims. (Cl. 260—279)

The present invention relates to new chemotherapeutically useful acridine compounds derived from a 9-aminoacridine, and the preparation thereof. More particularly, said acridine compounds are 9-(2-(2-hydroxethylamino) ethylamino) acridine and acid addition salts thereof.

The compounds of this invention have been found to possess useful chemotherapeutic properties, especially as anthelmintic agents.

The basic acridine compound, 9-(2-(2-hydroxyethylamino) ethylamino)-acridine having the formula

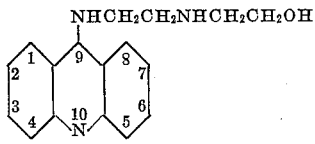

can be prepared by various methods. However, the procedure preferred in practicing the invention involves heating a mixture of phenol and 9-chloroacridine to form 9-phenoxyacridine hydrochloride (which need not be isolated), which is then heated with 2-(2-hydroxyethylamino) ethylamine. While the foregoing procedure is preferred in practicing my invention, other methods of preparing said basic acridine compound are operable. For example, 9-chloroacridine can be heated directly with 2-(2-hydroxyethylamino) ethylamine, without first reacting the former with phenol. In addition, the basic side chain can be attached stepwise to the acridine nucleus. In such a process, 9-chloroacridine or 9-phenoxyacridine hydrochloride is heated with 2-hydroxyethylamine to give 9-(2-hydroxyethylamino)-acridine, which is then treated with a halogenating agent such as thionyl chloride to yield 9-(2-chloroethylamino) acridine, which, in turn, is treated with 2-hydroxyethylamine to give the desired basic acridine compound, 9-(2-(2-hydroxyethylamino) ethylamino) acridine.

The salts of the instant invention are prepared by treating the foregoing described basic acridine compound with the appropriate acid. In practicing my invention I found it convenient to employ the dihydrochloride salt. However, other salts are within the scope of the invention. Included among other salts which may be employed are the following, formed by reacting the base with the appropriate relatively non-toxic inorganic or organic acid: the dihydrobromide, diphosphate, disulfate, disulfamate, diethanesulfonate, ditartrate, dicitrate, disuccinate, diacetate, dibenzoate, dioleate, and the like.

The following example fill further illustrate a specific embodiment of my invention.

9- (2-(2-Hydroxyethylamino) ethylamino) acridine dihydrochloride.—A stirred mixture of 100 g. of phenol and 21 g. of 9-chloroacridine was heated on the steam bath for about 15 minutes and 13 g. of 2-(2-hydroxyethylamino) ethylamine was added. After heating for about 2 hours on the steam bath the slightly cooled reaction mixture was poured into a stirred solution of 25 cc. of conc. hydrochloric acid in 300 cc. of acetone. After about 1 hour the product was filtered off, washed with acetone and then freed from most of the adhering phenol by stirring in hot acetone and filtering the mixture while hot. The resulting solid was recrystallized from about 750 cc. of ethanol containing a small amount of water, yielding about 25 g. of the desired product, 9-(2-(2-hydroxyethylamino) ethylamino) acridine dihydrochloride, M. P. 244.5–246.5° C. (corr.).

I claim:

1. A compound selected from the group consisting of 9-(2-(2-hydroxyethylamino) ethylamino) acridine having the formula

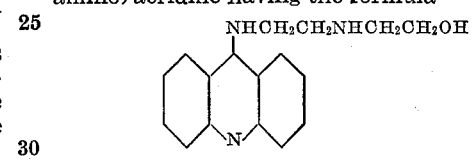

and acid addition salts thereof.

2. 9-(2 - (2- Hydroxyethylamino) ethylamino) - acridine dihydrochloride having the formula

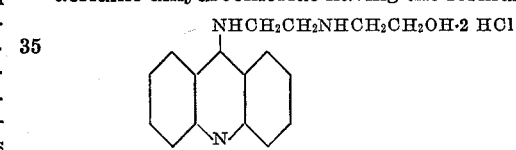

3. In the process of preparing 9-(2-(2-hydroxyethylamino) ethylamino) acridine having the formula

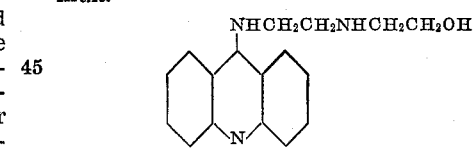

the step which comprises heating a member of the group consisting of 9-chloroacridine and 9-phenoxyacridine hydrochloride with 2-(2- hydroxyethylamino) ethylamine.

ALEXANDER R. SURREY.

(References on following page)

REFERENCES CITED

The following references are of record in the file of this patent:

UNITED STATES PATENTS

| Number | Name | Date |
|---|---|---|
| 2,113,357 | Mietzsch et al. | Apr. 5, 1938 |

OTHER REFERENCES

Chem. Abst., vol. 37, page 2408 (1943) (Citing: Proc. Soc. Exp't'l Biol. Med., vol. 52, pp. 90 and 91 (1943).

Mosher: "Antimalarials: Natural and Synthetic" (Edwards Bros., Ann Arbor, Mich.; 1942), page 69.

Shriner et al.: "Synthetic Antimalarials" (Publ. in Bloomington, Indiana, 1941) page 30.